United States Patent
Shuba et al.

(10) Patent No.: US 8,481,152 B2
(45) Date of Patent: Jul. 9, 2013

(54) REFRACTORY MATERIAL WITH IMPROVED RESISTANCE TO MOLTEN SLAG

(75) Inventors: Roman Shuba, Niskayuna, NY (US); Wei Chen, Sugar Land, TX (US); Anthony Mark Thompson, Aliso Viejo, CA (US)

(73) Assignee: General Electric Company, Niskayuna, NY (US)

( * ) Notice: Subject to any disclaimer, the term of this patent is extended or adjusted under 35 U.S.C. 154(b) by 1316 days.

(21) Appl. No.: 12/191,863

(22) Filed: Aug. 14, 2008

(65) Prior Publication Data

US 2010/0040778 A1    Feb. 18, 2010

(51) Int. Cl.
  *B32B 5/18*   (2006.01)
  *B32B 18/00*  (2006.01)

(52) U.S. Cl.
  USPC .......... 428/305.5; 428/321.6; 428/317.9; 428/319.1; 428/320.2; 428/432; 428/697; 428/702; 428/472; 501/103; 501/127; 501/132

(58) Field of Classification Search
  None
  See application file for complete search history.

(56) References Cited

U.S. PATENT DOCUMENTS

| | | | |
|---|---|---|---|
| 2,060,017 A * | 11/1936 | Benner | 428/70 |
| 2,631,836 A * | 3/1953 | Willis | 432/250 |
| 2,792,214 A | 5/1957 | Eusner et al. | |
| 3,252,827 A | 5/1966 | Rose et al. | |
| 3,681,113 A * | 8/1972 | Yoldas | 501/133 |
| 3,873,344 A | 3/1975 | Church et al. | |
| 4,029,466 A | 6/1977 | Ishii et al. | |
| 4,039,344 A * | 8/1977 | Nishikawa et al. | 501/89 |
| 4,053,321 A * | 10/1977 | Okumiya et al. | 501/105 |
| 4,290,984 A * | 9/1981 | Gaffney | 264/30 |
| 4,435,514 A | 3/1984 | Hartline | |
| 4,483,932 A | 11/1984 | Washburn et al. | |
| 4,497,901 A | 2/1985 | Ohtsuki et al. | |
| 4,568,652 A | 2/1986 | Petty, Jr. | |
| 4,687,749 A | 8/1987 | Beall | |
| 4,806,509 A | 2/1989 | Porterfield | |
| 5,010,046 A | 4/1991 | Butkus et al. | |
| 5,053,366 A | 10/1991 | Schoennahl | |
| 5,086,020 A * | 2/1992 | Ishino et al. | 501/105 |
| 5,106,795 A * | 4/1992 | Drake et al. | 501/126 |
| 5,344,801 A * | 9/1994 | Kida et al. | 501/105 |
| 5,418,012 A | 5/1995 | Kung | |
| 5,523,150 A | 6/1996 | Numata et al. | |

(Continued)

FOREIGN PATENT DOCUMENTS

| | | |
|---|---|---|
| DE | 100 59 580 C1 * | 4/2002 |
| DE | 10059580 C1 | 4/2002 |

(Continued)

OTHER PUBLICATIONS

Callister, Materials Science and Engineering, An Integrated Approach, 2012, p. 616.*

(Continued)

*Primary Examiner* — David Sample
(74) *Attorney, Agent, or Firm* — Ann M. Agosti

(57) ABSTRACT

A treated refractory material includes a porous refractory material having one or more protective materials disposed within pores of the refractory material. Methods of preparing the treated refractory material are also provided. The treated refractory material provides protection from the penetration of slag and extends the service life of the refractory material.

14 Claims, 2 Drawing Sheets

U.S. PATENT DOCUMENTS

| | | | |
|---|---|---|---|
| 5,650,121 | A | 7/1997 | Dody et al. |
| 5,736,248 | A | 4/1998 | Sointsev et al. |
| 6,200,631 | B1 * | 3/2001 | Kobayashi et al. ........... 427/140 |
| 6,649,552 | B1 | 11/2003 | Alary |
| 6,815,386 | B1 | 11/2004 | Kwong et al. |
| 7,232,780 | B2 | 6/2007 | Zhu et al. |
| 7,914,904 | B2 * | 3/2011 | Morra et al. .................. 428/663 |
| 8,105,683 | B2 * | 1/2012 | Thompson et al. ........ 428/307.7 |
| 2002/0094930 | A1 * | 7/2002 | Brown et al. ................. 501/123 |
| 2004/0105984 | A1 * | 6/2004 | Van Den Neste et al. .... 428/426 |
| 2004/0234824 | A1 | 11/2004 | Yamada |
| 2008/0216603 | A1 * | 9/2008 | Thompson et al. ............. 75/301 |
| 2009/0188347 | A1 * | 7/2009 | Taber et al. ..................... 75/301 |
| 2009/0202717 | A1 * | 8/2009 | Morra et al. .................. 427/225 |
| 2011/0033613 | A1 * | 2/2011 | Matyas et al. ................ 427/142 |

FOREIGN PATENT DOCUMENTS

| | | |
|---|---|---|
| EP | 0939067 B1 | 6/2002 |
| JP | 63112439 A | 5/1988 |
| JP | 02263723 A * | 10/1990 |

OTHER PUBLICATIONS

U.S. Appl. No. 11/683,260, filed Mar. 7, 2007, General Electric.
PCT/US2009/049192 Search Report, Jun. 1, 2010.

* cited by examiner

REFRACTORY MATERIAL WITH IMPROVED RESISTANCE TO MOLTEN SLAG

BACKGROUND

The invention relates generally to refractory materials and, more particularly, to refractory materials with reduced slag penetration.

Coal and other hydrocarbons may be subjected to partial combustion to produce gases that are useful as fuels and starting materials for chemical syntheses. This gasification typically takes place in large furnaces that allow the hydrocarbon feedstock to be subjected to high temperatures to produce the gaseous products of the reaction. In addition to the desired products, the by-products of the reaction may include waste products, such as slag. Slag is a low viscosity blend of inorganic oxides that is produced as a by-product in a slagging coal gasifier when the coal or coke is partially oxidized. The slag may, for example, contain silica, aluminum oxide, calcium oxide and iron oxide.

To contain the heat of the reaction, the walls of the gasifier may be lined with a refractory material that is able to withstand high temperatures. Typically, the refractory material is quite porous. For example, common refractory materials are sintered bricks with highly connected pore structures. These materials are vulnerable to damage by the gasification reaction. As the slag byproduct flows along the walls of the gasifier, it infiltrates into the pores in the refractory material. This infiltration may cause degradation of the refractory material through dissolution and/or cracking.

As a result of slag infiltration, refractory material that lines a gasifier may break down relatively quickly and may need to be replaced several times during the lifespan of the gasifier. The refractory material may be replaced by manual workers entering the gasifier and removing the damaged bricks or, in certain cases, the entire lining. Because the gasifiers are operated at very high temperatures, this may involve shutting the gasifier down and allowing it to cool for several days until workers can safely enter. Such replacement of the refractory material is generally costly, both in terms of the materials and labor involved and operating time lost, because the gasifier cannot run for several days during the replacement process.

SUMMARY OF THE INVENTION

Provided herein is a material that includes a refractory material comprising a crystalline phase, and a protective material comprising an amorphous phase, wherein the protective material includes a refractory glass having a melting temperature greater than 700° C.

Also provided herein is a process for treating a refractory material that includes applying one or more protective materials to pores of a refractory material, wherein the protective material includes a refractory glass having a melting temperature greater than 700° C.

Also provided herein is a material that includes a refractory material comprising a crystalline phase, and a protective material comprising one or more metallic compounds comprising molybdenum, niobium, tantalum, or tungsten.

Also provided herein is a process for treating a refractory material that includes applying one or more protective materials to pores of a refractory material, wherein the protective material includes one or more metallic compounds comprising molybdenum, niobium, tantalum, or tungsten.

Also provided herein is a material that includes a refractory material comprising a crystalline phase, and a protective material comprising one or more pure metals, metal halides, metal silicides, or metal carbides.

Also provided herein is a process for treating a refractory material that includes applying one or more protective materials to pores of a refractory material, wherein the protective material includes one or more pure metals, metal halides, metal silicides, or metal carbides.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques provide treated materials and methods of making and using the same. The treated materials are suitable for use in conjunction with gasifiers, furnaces, or other high-temperature vessels. In an embodiment, the treated material may be used to line the reaction vessel of a hydrocarbon gasifier. The treated material includes a protective material that at least partially fills pores in a refractory material to prevent slag infiltration and to prevent other damage associated with the high temperature reactions.

The treated refractory material minimizes the penetration of liquid slag into the lining of the gasifier. In one embodiment, as the slag begins to penetrate the surface pores of the refractory material, the liquid slag encounters protective materials disposed within the pores. The liquid slag reacts with the protective materials to create either a high-melting phase or phases or a high-viscosity liquid. In either case, further penetration of the liquid slag is suppressed. Creation of a high-melting phase or phases reduces the volume of liquid phase and minimizes slag penetration into the refractory material. Increasing the viscosity of the slag also inhibits penetration deeper into the refractory material. When the infiltrating slag precipitates higher-melting phases, this reduces the volume of liquid phase slag available for penetration into the refractory material.

In another embodiment, when fine particles of protective materials are disposed within pores of the refractory material, the slag may become enriched in these materials, which in turn increases the viscosity of the liquid slag. Such increased viscosity inhibits slag penetration into the refractory material.

In another embodiment, the protective material minimizes the penetration of the slag into the refractory material by physically impeding progress of the slag into the pores. For example, certain metals and their compounds are resistant to dissolution in slag and reduce the permeability of the refractory material by filling pores and channels with relatively inert material that takes up space that may otherwise be filled with liquid slag.

In another embodiment, the treated refractory material is at least partly self-healing. Because the pores and channels of the refractory material may be highly connected to one another, the protective material may be dispersed through the entire refractory material. If the surface layers of the treated refractory material are removed, this may expose protective material in pores located just beneath those surfaces. This protective material is then available to reform a renewed boundary against further infiltration of slag.

Figure 1:
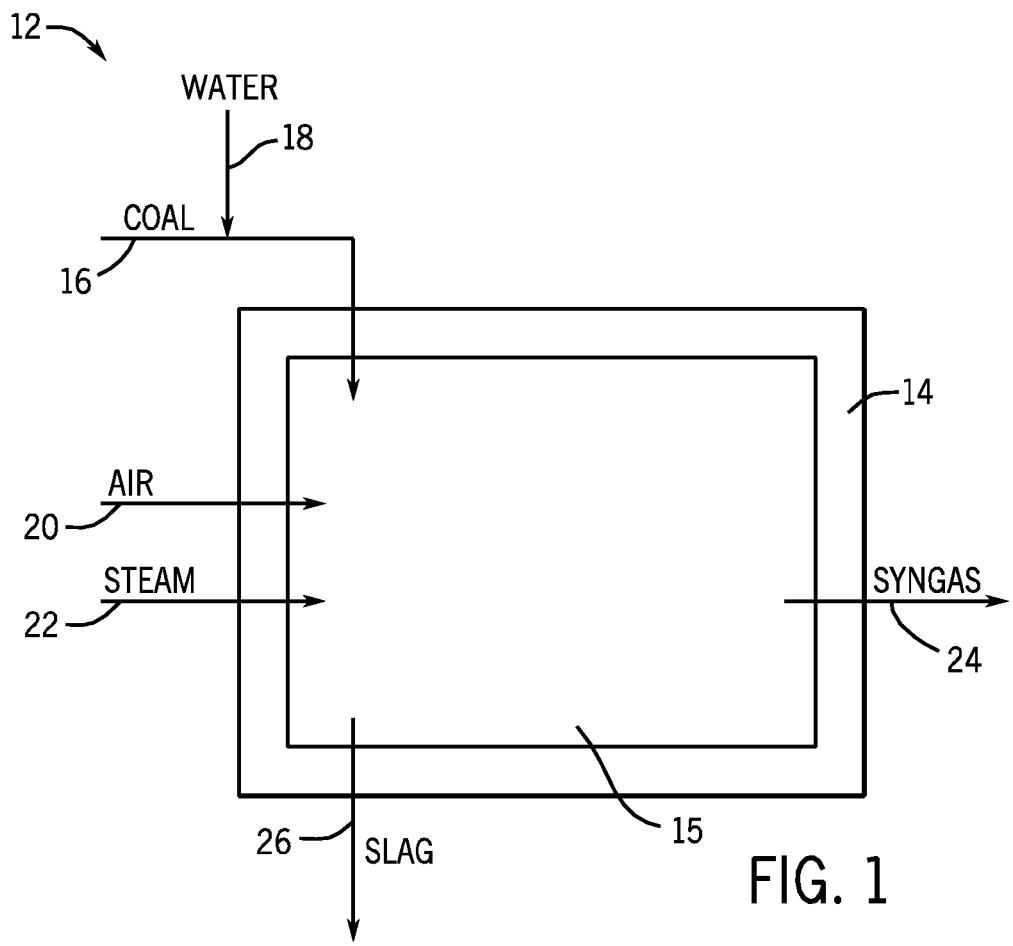
FIG. 1 is a block diagram of an exemplary coal gasifier according to an embodiment.

In an exemplary embodiment shown in FIG. 1, the treated material may be used in conjunction with a hydrocarbon gasifier, such as a coal gasifier 12. The coal gasifier 12 includes a lining of treated material 14 surrounding a reaction space 15. Coal may be introduced into the gasifier 12 through line 16. Coal introduced through line 16 enters the gasifier 12 and may be in particulate or slurry form. For example, in an embodiment, the coal line 16 may also include a water line 18 for mixing the coal into a slurry. In addition, the coal line 16 may include any suitable mixing structures (not shown) for mixing the slurry to the appropriate specifications. Air, oxygen and/or steam may be introduced into the reaction space 15 through lines 20 and 22, respectively, to provide for the gasification of the coal. The reaction products, which may include carbon monoxide and hydrogen (i.e., syngas), may be discharged from the gasifier 12 through line 24. The inorganic constituents of the coal are discharged from the gasifier 12 through line 26 typically as a molten slag that is subsequently cooled and solidified.

The gasifier 12 may be any suitable gasifier, including a counter-current fixed bed gasifier, co-current fixed bed gasifier, a fluidized bed reactor, or an entrained flow gasifier. In addition, the gasifier may use any suitable carbon source in the reaction, including coal, petroleum, biomass, and/or wood.

Figure 2:
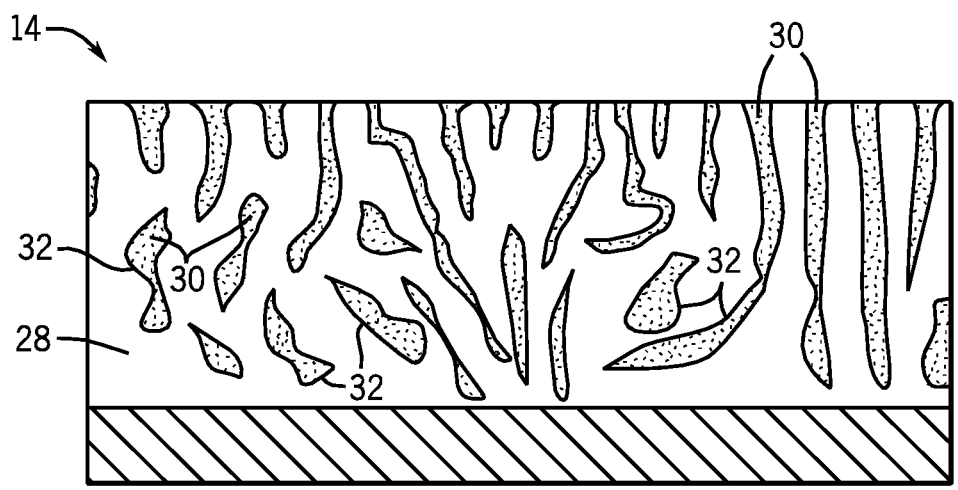
FIG. 2 is a cross-sectional view of a refractory material according to an embodiment.

In one embodiment, a treated material 14, shown in cross-section in FIG. 2, includes a refractory material 28 having one or more protective materials 30 disposed within the pores 32. The refractory material 28 may include any suitable composition that may be formed into a desired shape suitable for lining a gasifier 12. In one embodiment, the refractory material 28 is formed into a brick or block. In another embodiment, the refractory material 28 is a sintered brick or an as-fabricated brick. The refractory material 28 may be sintered by firing or heat-treating the material to a temperature of at least about 1000° C. In one embodiment, the refractory material 28 is fired at a temperature from about 1000° C. to about 1800° C. In one embodiment, the refractory material 28 is fired for at least about 1 hour. In another embodiment, the refractory material 28 is fired from about 1 hour to about 24 hours. In another embodiment, the refractory material 28 is fired from about 1 hour to about 5 hours. The refractory material 28 may be sintered in air or in a nitrogen or argon environment.

The refractory material 28 may include a chromia-alumina sintered brick, a chromia-alumina-phosphate sintered brick, a chromia-zirconia sintered brick, or a chromia-magnesia sintered brick. For example, a suitable refractory brick may be Aurex90 or Aurex95P (Harbison-Walker Refractories Limited, Wirral, UK). Other suitable refractory bricks may include Zirchrom-90/Zirchrom-900 (Saint-Gobain, Savoie Refractaires, Vénissieux Cedex, France) or a chrome-magnesia spinel grain.

The protective material 30 is a chemical or chemical blend compatible with the refractory material 28 that will not substantially decompose in typical gasifier operating atmospheres of up to about 80 atm and at typical gasifier operating temperatures of up to about 1300° C. to about 1600° C. The protective materials 30 may be any type of material that impedes the infiltration of slag into the refractory material 28.

The protective material 30 may fill the pores and channels 32 of the refractory material 28 in the form of a powder. The powder may include micron-sized or nano-sized particles. In one embodiment, the particle sizes of the protective material 30 range from about 5 nm to about 200 µm. In another embodiment, the particle sizes range from about 5 nm to about 100 µm. In another embodiment, the powder includes particles ranging in size from about 1 µm to about 10 µm. In another embodiment, the particle sizes range from about 1 µm to about 2 µm. In one embodiment, the protective material 30 includes nano-sized particles. In one embodiment, the protective material 30 includes particle sizes from about 5 nm to about 100 nm. In another embodiment, the protective material 30 includes materials with a particle size from about 5 nm to about 10 nm. Nano-sized powders may be applied to the refractory material 28 as colloid solutions with typical solid loadings of about 10 to about 50 percent by weight. The colloid solution may be an aqueous suspension and may contain surfactants to aid in dispersing the particles. It should be recognized that under typical gasifier conditions morphology of the powder may change due to sintering, typically leading to particle coarsening, particularly for nano-sized powders.

In one embodiment, the amount of protective material 30 is from about 2 to about 15 percent by volume based on the total volume of the refractory material 28. For example, the protective material 30 may infiltrate the refractory material 28 to partially fill the pores 32 of the refractory material 28. In one embodiment, the protective material 30 fills from about 3 percent to about 60 percent of the pore volume. In another embodiment, the protective material 30 infiltrates the refractory material 28 to fill from about 20 percent to about 50 percent of the pore volume. In one embodiment, the protective material 30 at least partially coats the inner surfaces of the pores 32 and forms a surface barrier within the pores to inhibit the penetration of liquid slag into the refractory material.

The protective material 30 may include any combination of suitable compounds. In one embodiment, the protective material 30 may be a refractory glass having a melting temperature greater than the operating temperature of the gasifier 12, for example greater than 700° C. In specific embodiments, the refractory glass may have a melting temperature of at least 1200° C., at least 1300° C., at least 1500° C., or at least 1600° C. A suitable refractory glass may include a refractory glass ceramic with enstatite, as disclosed in U.S. Pat. No. 4,687,749, which is able to withstand operating temperatures of at least 1500° C. In one embodiment, the refractory glass may be a synthetic slag, i.e., a slag with a chemical composition that has a relatively high melting temperature. Typically, in the prior art, it is desirable for slag to have as low a melting temperature as possible in order to facilitate its removal from a gasifier. In accordance with the present techniques, a synthetic slag may be composed from materials that are characterized by forming a crystalline structure or spinel layer on the refractory at the operating temperature of the gasifier. Such materials may include chromium oxide or aluminum oxide. In one embodiment, the synthetic slag may include $Al_2O_3$ in excess of 85% to provide a melting temperature above 2000° C. as disclosed in U.S. Pat. No. 4,795,491. In another embodiment, the synthetic slag may include rare earth silicates.

In another embodiment, the protective material 30 may include one or more metallic compounds that include molybdenum, niobium, tantalum, or tungsten. These metallic compounds may include one or more oxides of molybdenum, niobium, tantalum, or tungsten or pure metals. The mention of the oxide of any element in one oxidation state includes oxides of this element in all existing oxidation states. For instance, tungsten oxide includes $W_2O_3$, $WO_2$, and $WO_3$. In addition, the molybdenum, niobium, tantalum, or tungsten compounds may include pure metals, carbides, halides, or silicides.

In another embodiment, the protective material 30 may include one or more pure metals, metal halides, metal silicides, or metal carbides where the metal may be one or more of aluminum, chromium, titanium, zirconium, yttrium, magnesium, or a rare earth metal. Rare earth metals may include lanthanum, cerium, praseodymium, neodymium, promethium, samarium, europium, gadolinium, terbium, dysprosium, holmium, erbium, thulium, ytterbium, lutetium and mixtures thereof.

The protective material 30 may be applied to the refractory material 28 by any suitable method. The protective material 30 may infiltrate the refractory material 28 by painting, spraying, dipping, coating or vacuum infiltration. The protective material 30 may be a precursor compound, such as a salt, that is dispersed in a solvent, such as water, an alcohol or other type of solvent. In one embodiment, the protective material 30 may be applied to the refractory material 28 as a precursor material, such as a nitrate or acetate salt, that may be converted into the protective material 30 through a treatment or process. In one embodiment, the protective material 30 infiltrates the refractory material 28 as a suspension, slurry or liquid solution of the precursor material. The suspension, slurry, or liquid solution penetrates into the refractory material 28, depositing the precursor material throughout the pores of the porous refractory material 28. The refractory material 28 is heat treated to evaporate the solvent or decompose the solvent leaving the protective material 30 situated throughout the open pores of the refractory material 28. For example, rare earth nitrate is infiltrated into the refractory material 28 and heat treated to leave rare earth oxide situated in the pores of the refractory material 28. In another example rare earth iodide is infiltrated into the refractory material 28 and then heat treated in air to leave rare earth oxide situated in the pores of the refractory material 28. The heat treatment to evaporate or decompose the solvent may be at a temperature in a range of from about 100° C. to about 1800° C. from about 1 hour to about 10 hours. In another embodiment, the heat treatment is at a temperature in a range of from about 500° C. to about 700° C. from about 1 hour to about 2 hours. In another embodiment, the heat treatment is performed under vacuum to assist in the evaporation of the solvent.

In another embodiment, the protective material 30 is dispersed into the pores by vacuum infiltration. In one embodiment, a preformed refractory material 28, such as a sintered brick or an as-fabricated brick, is placed under vacuum. A solution or suspension of the protective material 30 is admitted to penetrate the pores of the refractory material 28, and the vacuum is released. In an alternative embodiment, the refractory material 28 can first be immersed in the suspension or solution and a vacuum applied. The solution or suspension infiltrates into the refractory material 28 as the vacuum is applied. Upon release of the vacuum, no further infiltration is obtained. In another embodiment, the solution or suspension is admitted into the material by infiltration at atmospheric pressure. In one embodiment, when infiltrating a metal halide into the refractory material 28, the metal halide may be infiltrated in a nitrogen atmosphere. Alternatively, the metal may be infiltrated as part of a hydrocarbon resin.

Figure 3:
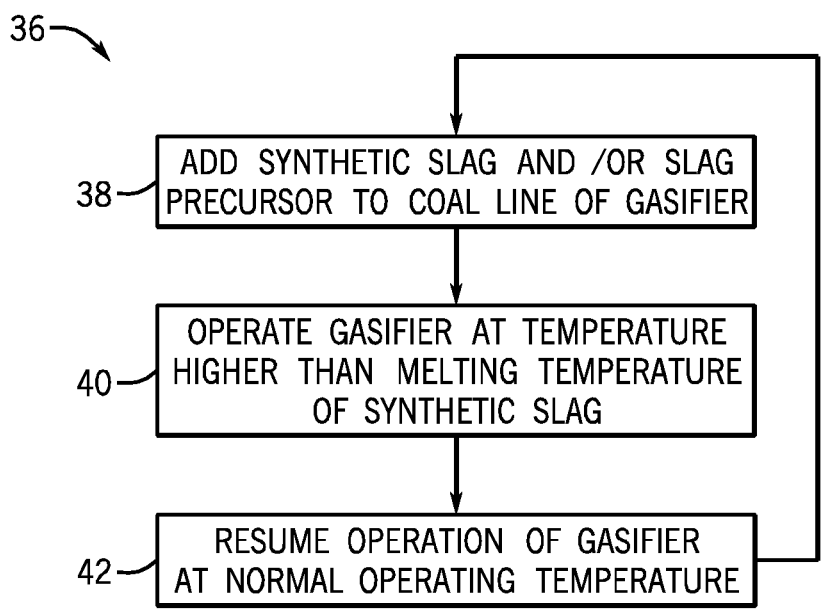
FIG. 3 is a flowchart of a method of manufacturing refractory material according to an embodiment.

The refractory material 28 may be treated with the protective material 30 before or after the refractory material 28 has been assembled into a gasifier 12. In one process 36, shown in FIG. 3, the protective material 30 is applied as a final coating to the refractory material 28 lining the walls of the gasifier. In one embodiment, a synthetic slag may be added as an input in the coal line 20 of the gasifier 12 in step 38. The synthetic slag may be in solid form or may be in the form of a slurry. The gasifier 12 is then operated at temperatures in excess of the melting temperature of the synthetic slag in step 40. For example, the gasifier may be operated at temperatures in excess of 1300° C. During this step, the synthetic slag melts and infiltrates the pores of the refractory material. Once the synthetic slag coating is applied to the refractory material 28, the gasifier 12 may then be operated at normal operating temperatures for coal gasification in step 42. At certain points during the lifespan of the gasifier 12, the process 36 may be repeated to reapply the protective material 30 as it is worn away. In another embodiment, compounds containing certain modifying elements may be added to the gasifier feed to modify the resultant slag composition and create a refractory slag. For example, monazite or bastnasite ore may be added to coal gasifier feedstock to create refractory rare-earth silicate slag in situ instead of adding synthetic slag.

In another embodiment, a process for making treated refractory material involves blending refractory material and one or more protective materials 30 and sintering the blend, wherein the protective material 30 in such an embodiment may include molybdenum, niobium, tantalum, or tungsten compounds, such as oxides pure metals, carbides, halides, or silicides. The blend of refractory material 28 and protective material 30 may be formed into any desired shape. In one embodiment, the refractory material 28 is formed into a brick or block. Accordingly, the treated refractory material 28 may be in the form of a composite containing protective material 30 in the amorphous phase (e.g., refractory glass) or in a crystalline second phase (e.g., a rare-earth oxide) and refractory material 28 in the main crystalline phase. The blend of refractory material 28 and protective material 30 may be sintered by firing or heat-treating the material to a temperature of at least about 1000° C. In one embodiment, the material is fired at a temperature from about 1000° C. to about 1800° C. for at least about 1 hour or from about 1 hour to about 24 hours. The refractory material 28 may be sintered in air or in a nitrogen or argon environment.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A material comprising:
    a refractory material comprising a crystalline phase; and
    a protective material comprising an amorphous phase,
        wherein the protective material comprises a refractory glass having a melting temperature greater than 700° C.,
    wherein the protective material is disposed in pores in the refractory material.

2. The material of claim 1, wherein the melting temperature of the refractory glass is greater than 1300° C.

3. The material of claim 1, wherein the protective material comprises enstatite.

4. The material of claim 1, wherein the refractory material comprises a chromia-alumina sintered brick, a chromia-alumina-phosphate sintered brick, a chromia-zirconia sintered brick, or a chromia-magnesia sintered brick.

5. The material of claim 1, wherein the protective material fills from about 3 to about 60 percent of the volume of the pores in the refractory material.

6. The material of claim 1, wherein the protective material comprises a powder.

7. The material of claim 1, wherein the protective material comprises from about 2 to about 15 percent by volume of the refractory material.

8. The material of claim 1, wherein the material is disposed on the lining of a gasifier.

9. A material comprising:
   a refractory material comprising a crystalline phase, wherein the refractory material comprises a chromia-alumina sintered brick, a chromia-alumina-phosphate sintered brick, a chromia-zirconia sintered brick, a chromia-magnesia sintered brick, or a combination thereof; and
   a protective material comprising an amorphous phase, wherein the protective material comprises a refractory glass having a melting temperature greater than 700° C.

10. The material of claim 9, wherein the melting temperature of the refractory glass is greater than 1300° C.

11. The material of claim 9, wherein the protective material comprises enstatite.

12. The material of claim 9, wherein the protective material comprises a powder.

13. The material of claim 9, wherein the protective material comprises from about 2 to about 15 percent by volume of the refractory material.

14. The material of claim 9, wherein the material is disposed on the lining of a gasifier.

* * * * *